A. D. FEST.
PROCESS FOR RECOVERING SOLID OR LIQUID MATTER FROM A SOLUTION OR SEMISOLUTION CONTAINING SAME.
APPLICATION FILED JUNE 9, 1919.
1,414,562.
Patented May 2, 1922.
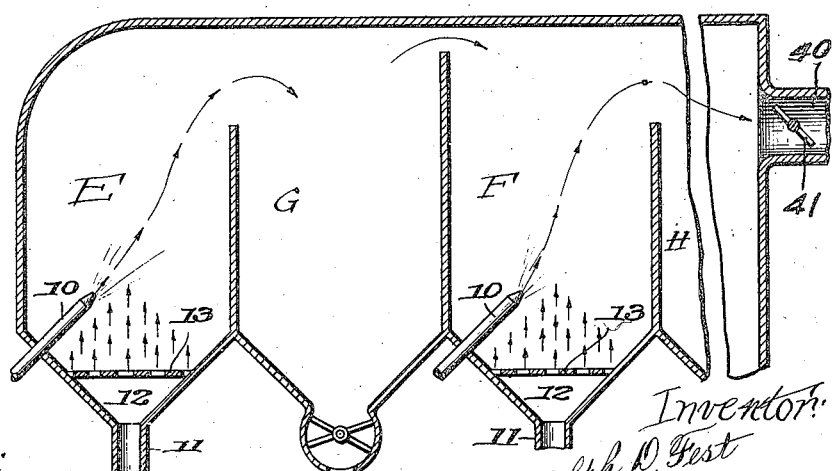

UNITED STATES PATENT OFFICE.

ADOLPH D. FEST, OF CHICAGO, ILLINOIS.

PROCESS FOR RECOVERING SOLID OR LIQUID MATTER FROM A SOLUTION OR SEMI-SOLUTION CONTAINING SAME.

1,414,562.  Specification of Letters Patent.  Patented May 2, 1922.

Application filed June 9, 1919. Serial No. 302,823.

*To all whom it may concern:*

Be it known that I, ADOLPH D. FEST, a citizen of the United States, residing in Chicago, in the county of Cook and State of Illinois, have invented certain new and useful Improvements in Processes for Recovering Solid or Liquid Matter from a Solution or Semisolution Containing Same, of which the following is a specification.

The present invention relates to separating the moisture from the constituent solids or liquids of solutions and semi-solutions and recovering such solids or liquids in the form of a substantially dry powder, or as liquids respectively.

It is old to effect such separation by means of heated air or any other suitable gas having an avidity for water, and at any desired temperature, the air or gas being brought into contact with a finely divided spray of the liquid to be desiccated. By this contact the air or gas takes up the moisture from the liquor and the solid or liquid constituents fall to the bottom or can be removed otherwise. Manifold variations of apparatus and processes are known to interested industries and do not require a special description.

So far as I know, in all of the proposed processes the separation of the solid or liquid matter from the water is either imperfect (filters have been suggesed to improve this somewhat) or the air or gas is not utilized to full capacity and efficiency, or both, so that for a great many purposes the above-referred-to processes cannot successfully be used.

The chief objects of my invention are to effect, in a simple and economical manner, a complete separation of the solid or liquid constituents of the liquor from the water, without prior concentration or subsequent filtration, and to do so while obtaining the highest efficiency of the air or gas used as a medium for separation, thus reducing the cost incident to heating and moving large volumes of the air or gas.

These improvements over the old art are obtained by subjecting the air or gas mixed with the spray to a lengthening or prolonging of the time of its action upon the liquid to be desiccated. This may be effective by reduction of the velocity of the air or gas stream, after being mixed with the spray, by conducting the mixture through a series of separating units before it is finally discharged. Other methods also may be available, and I am suggesting the above as a convenient illustration of the principle which may be employed.

By this prolonged time of action of the air or gas upon the sprayed liquid each individual minute globule of the spray is acted upon more effectively and more thoroughly than under the old art so that the separation is not only more complete, but the air or gas is given opportunity to take up as much moisture as it can hold at a given temperature and consequently the highest degree of efficiency for the air or gas is obtained. Any excess or any lack of air or gas in one spray unit will be equalized in the series of spray units through the mixing of the various incoming sprays and a uniform separation will be effected. In the old art the time of action of air or gas upon the spray is so short that either a portion of the air or gas escapes entirely unused, or escapes not completely saturated with water vapors at its then temperature.

In the accompanying drawing, which forms a part of this specification, I have shown apparatus illustrating the method of operation hereinabove mentioned. The drawing is a vertical longitudinal section through such fragmentary parts of the device as are sufficient to show both an approved arrangement and construction and also the process involved. The device is in the form of a series of somewhat independent units, the units, being connected however, for the passage of the mixture from one to the other in sequence, thus prolonging the time of action by the air or gas upon the spray.

The structure illustrated comprises a housing divided into two principal compartments E and F. The solution containing the solid or liquid matter is sprayed into the chambers E and F by the nozzles 10, and air or gas enters through the pipes 11 enlarged at 12 so that the air or gas may enter the spraying chambers E and F over a relatively wide area through the foraminous walls 13.

Between the chambers E and F is the chamber G, and the mixture from the chamber E is retarded there somewhat, and substantially the proportion of recovery which has heretofore been made in devices of this kind will be had from the chamber G. The flow continues, however, out of the chamber G into the chamber F, and thence, together with a fresh discharge into the chamber F, goes into the chamber H, which is to be understood as being in all material respects like the chamber G, but it may be larger, and so on, my improvements contemplating a series of units such as E—G and F—H, the air or gas being finally discharged through the opening 40 controlled by the valve 41. The mixture is thus maintained in the device for a relatively long period of time and the spray is acted upon by the air or gas to the latter's full capacity and the desired complete separation thereby obtained.

It is to be understood that although I have shown only one nozzle and one air intake in each of the spray chambers, in practice there will be any desired number of these nozzles and air or gas intakes according to the desired capacity of the machine. The spray nozzles and air intakes shown are to be understood as representing a series of each. These nozzles and air intakes may be side by side or above each other, and it is only necessary to increase the depth or height of the casing to provide for any desired number of the intake elements. It is only a matter of mechanical skill to increase the capacity of the illustrated device as may be desired, in view of the teachings herein contained.

No specific instructions need to be given in regard to the spraying device, as any of the well-known sprayers employed for such purposes may be employed.

According to these improvements not only is one able to obtain a higher degree of efficiency in a more complete recovery of the solids or liquids, and at a less cost, than heretofore, but the feature of completely utilizing the gas or air makes it feasible to apply the process to the recovery of relatively low grade materials where the cost of operation according to prior processes and apparatus would be prohibitive. For instance, in the paper making industry large quantities of waste liquor are daily discharged into the water courses and only a cheap method would justify the effort for the recovery of its ingredients. In this connection it is pointed out that the heating of air or gas to such a degree as gives it the property of absorbing moisture to an effective extent is quite expensive, and in the paper making industry large volumes of the waste liquor would be passed through the device. By utilizing heated air which is to be had from the furnace of the paper mill, or from any other sources, and which can be obtained at about the temperature of 300° F., the present process may be carried on effectively in that industry. The relationship, however, of the expense to the value of the product is a critical one, and it is only by utilizing the heated air or gas to its full capacity that the process in such an industry would be justified.

In other industries where the value of the product is relatively high the principal advantages of these improvements are in the production of a higher percentage of the product than heretofore, and at a lower cost.

I claim:

1. The method of recovering solid or liquid matter from solutions or semi-solutions containing same which consists in spraying the solution or semi-solution into a mixing chamber, admitting as a continuous process into the mixing chamber substantially such a quantity of air or gas capable of absorbing the moisture of the spray as to produce after desiccation an air or gas saturated or substantially saturated with water vapors at a given drying temperature, conducting the mixture thus formed into a collecting chamber, conducting the air or gas and such spray as may be contained therein into a second mixing chamber, admitting spray from the liquid or semi-liquid and also a proportionate amount of air or gas into the second mixing chamber as a continuous process, conducting the air or gas and spray into a second collecting chamber and finally exhausting the air or gas containing moisture from the last mentioned chamber.

2. The method of recovering solid or liquid matter from solutions or semi-solutions containing same which consists in spraying the solution or semi-solution simultaneously into a plurality of mixing chambers spaced apart and arranged in a series, admitting as a continuous process into the mixing chambers respectively substantially such a quantity of air or gas capable of absorbing the moisture of the spray as to produce after desiccation air or gas saturated or substantially saturated with water vapors at a given drying temperature, conducting the mixture from the first mixing chamber of the series into a collecting chamber, conducting the air or gas and such spray as may be contained therein from said collecting chamber into the second mixing chamber of the series, conducting the mixture from said second mixing chamber together with the discharge thereinto from said first mentioned collecting chamber into a second collecting chamber, and so on throughout the series, and finally exhausting the air or gas containing moisture from the last chamber of the series.

ADOLPH D. FEST.